LOW-FREQUENCY INTERFERENCE SUPPRESSOR

Filed July 9, 1951

Inventor
LESLIE WALTER GERMANY
By Emery, Holcombe & Blair
Attorneys

Patented Apr. 13, 1954

2,675,424

UNITED STATES PATENT OFFICE 2,675,424

LOW-FREQUENCY INTERFERENCE SUPPRESSOR

Leslie W. Germany, Cambridge, England, assignor to Pye Limited, Cambridge, England, a British company Application July 9, 1951, Serial No. 235,859

Claims priority, application Great Britain July 11, 1950

6 Claims. (Cl. 178—7.3)

The present invention relates to television apparatus and more particularly to interference suppression circuits therefor.

It is an object of this invention to provide means for reducing the low-frequency interference sometimes encountered on television video waveforms. The most common source of trouble is interference from the supply mains in the form of hum.

The method used to reduce this interference is first to separate the interference from the video waveform and then to mix the interference back again in antiphase with the interference carried by the original video waveform. This method by itself can only be used for providing a picture to cuing and programme monitors, as the separated interference is not a perfect replica of the original interference and after reinsertion leaves a slight distortion on the base line of the waveform which is not desirable on the transmitted picture waveform. However, when it is required to more effectively remove the interference from a transmission channel the above method may be modified by using the compensating waveform above described to provide a waveform suitable for generating clamping pulses which will in turn clamp out the low-frequency interference from the original waveform.

The present invention, therefore, consists in a circuit for the elimination of low-frequency interference on a television video waveform, wherein the incoming television waveform carrying the low-frequency interference is fed to a circuit adapted to produce an output voltage proportional to any low-frequency interference present on the incoming waveform, said output voltage being mixed with the video waveform carrying the low-frequency interference, such that the said output voltage is mixed in antiphase with the interference carried by said video waveform. A feature of the invention consists in using the resulting signal to generate a clamping pulse or pulses which pulse or pulses control a clamping device to which the video waveform carrying the low-frequency interference is also fed, whereby the low-frequency interference is clamped out and a video waveform substantially free from low-frequency interference is obtained from said clamping device.

An embodiment of the invention will now be described with reference to the accompanying drawings in which.

Figure 1:
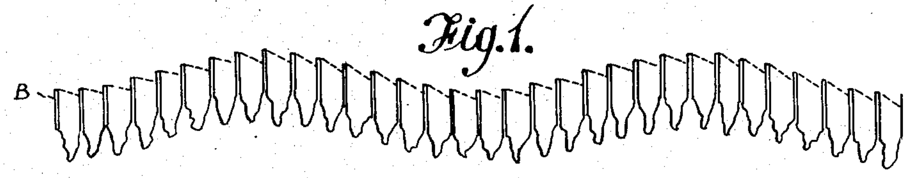
Figure 1 shows the effect of low-frequency hum interference on the television video waveform.
Figure 3:
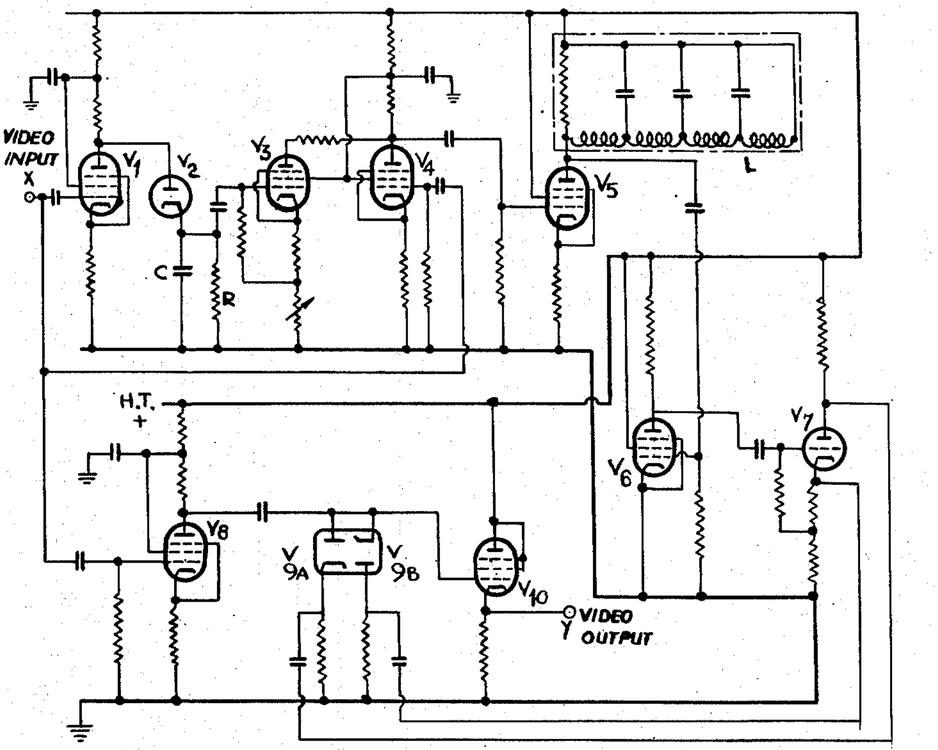
Figure 3 is a functional circuit diagram of an embodiment of the interference separator, and clamping circuits.
Figure 2:
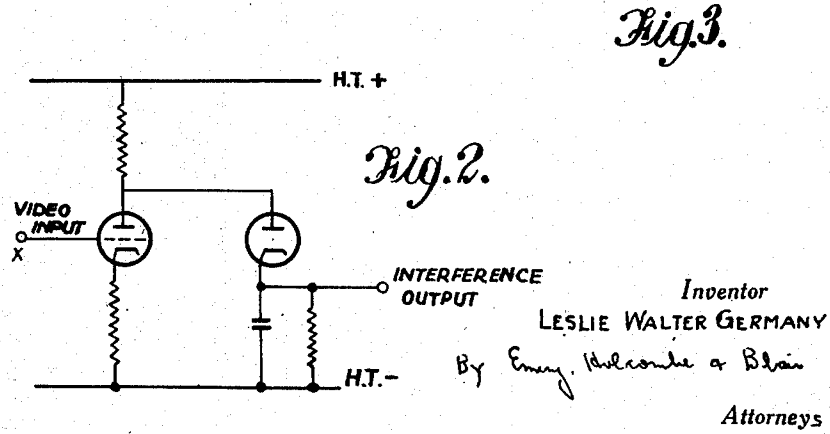
Figure 2 shows the basic form of the interference separator.

With reference to Figure 2, the video waveform with low-frequency interference (as shown in Fig. 1) is applied through the video input terminal X to the control grid of valve V1 in a positive sense and appears negative on the anode. The signal is then fed through a series diode valve V2 to a resistance load R shunted by a condenser C. The time constant CR is adjusted to a value that will allow the charge attained by C to leak partially away in the time interval between two line synchronising pulses of the television system. During the excursion of the voltage tracing a picture between line synchronising pulses the diode will be nonconducting and the charge attained by condenser C during the previous synchronising pulse will leak away gradually through R, but will not follow the picture waveform on the anode of the diode. On the arrival of the next synchronising pulse the voltage across C will have dropped to such a value that the diode will conduct and the condenser will be charged to the value of the new synchronising pulse. It will now be seen that when the base line of the synchronising pulses is modulated with a low-frequency waveform, the condenser C will be pulsed to this waveform at every line synchronising pulse, and the interference waveform will appear across the condenser C with the exception that the voltage across condenser C will drift slightly from this interference voltage due to the leakage through R between synchronising pulses. This output voltage waveform across C is shown at B in Fig. 1. This low-frequency interference waveform is then mixed in antiphase with the original video waveform carrying low-frequency interference and so largely eliminates the low frequency interference thereon. The elimination of low-frequency interference is not complete however, due to the discharge of condenser C between line synchronising pulses as mentioned above, and to obtain more complete elimination of the low-frequency interference, as is desirable on the transmitted picture waveform, the circuit arrangement shown in Fig. 3 is used. This circuit arrangement will now be explained. V1 and V2 correspond to the circuit of Fig. 2 and the interference waveform across condenser C is applied to the grid of a valve V3, which has a common anode load circuit with valve V4. The video waveform carrying low-frequency interference is applied to the grid of valve V4, and since the low-frequency interference signals appearing in the common anode circuit will be in antiphase they will be largely eliminated and a relatively interference free signal will remain. If desired a signal can be taken from this common anode circuit and used to provide a picture for cuing or programme monitors. The output from this common anode circuit of V3 and V4 is however fed to the grid of valve V5 which serves to separate the synchronising pulses from the picture intelligence in its grid circuit, and to form a series of line-to-line clamping pulses in its anode circuit, by means of the artificial line network indicated at L. These clamping pulses are fed to the grid of valve V6 which acts as a limiter and pulse shaper, the shaped pulses from the output of V6 being fed to the grid of valve V7. This latter valve is a clamping pulse phase splitter, the pulses appearing in antiphase in the anode and cathode load circuits respectively, from where they are applied respectively, one to the cathode of a clamping diode V9A and the other to the anode of a clamping diode V9B. These clamping diodes V9A and V9B are connected across the output circuit of an amplifier valve V8 to the input grid of which the video waveform with low-frequency interference is applied. This video waveform then appears at the anode of V8 where the clamping diodes V9A and V9B clamp out the low-frequency interference. The video waveform, now substantially free from low-frequency interference is finally fed through the cathode follower stage V11 to provide a low impedance output at the video output terminal Y.

Whilst a particular embodiment has been described, it will be understood that various modifications can be made without departing from the scope of the invention.

I claim:

1. A circuit arrangement for eliminating low-frequency interference on a television video waveform, comprising means for producing a voltage proportioanl to the low-frequency interference on the video waveform, a mixer circuit, means for feeding the video waveform carrying the low frequency interference to said mixer circuit means for feeding said voltage proportional to the low-frequency to the mixer circuit in antiphase with the interference carried by the incoming television waveform, means for generating a train of positive clamping pulses from said resultant mixed signals, means for generating a train of negative clamping pulses from said resultant mixed signals, a pair of clamping rectifiers, each having an anode and a cathode, means for applying said positive clamping pulses to the anode of the first clamping device, rectifier, means for applying the negative clamping pulses to the cathode of the second clamping rectifier, means for feeding said incoming television video signal carrying the low-frequency interference to the cathode of said first clamping rectifier and to the anode of the second clamping rectifier and an output circuit for deriving a video signal substantially free from low-frequency interference from said clamping rectifier.

2. A circuit arrangement for eliminating low-frequency interference on a television video waveform, comprising an amplifier valve, an electronic rectifier connected to the output of said amplifier valve, a condenser connected in series with said electronic rectifier across which a voltage is produced which is proportional to the low-frequency interference, a mixer circuit comprising two electronic valves each having an input electrode and having a common output load circuit, means for feeding the voltage across said condenser to the input electrode of the first of said valves, means for feeding said video waveform carrying low-frequency interference to the input electrode of the second of said valves, a separating valve for separating the synchronising pulses from the picture intelligence of said video waveform, means for feeding the signals produced across the output load of said mixer circuit to the input of said separating valve, means connected to the output of said separating valve for generating positive and negative clamping pulses from said synchronising pulses, a pair of clamping rectifiers each having an anode and a cathode, means for feeding said positive clamping pulses to the anode of the first of said clamping rectifiers, means for feeding negative clamping pulses to the cathode of the second of said clamping rectifiers, means for feeding said video waveform carrying said low-frequency interference to the cathode of said first clamping rectifier and to the anode of said second clamping rectifier to substantially clamp out said low-frequency interference and an output circuit for deriving a substantially interference-free video waveform from said clamping rectifiers.

3. A circuit arrangement as claimed in claim 2, wherein the valve for separating the synchronising pulses from the picture intelligence of the video waveform comprises an electronic valve having an anode, a cathode, and at least one grid electrode, means for feeding the video waveform to said grid, a resistor connected in series with said cathode and a delay network, comprising elements of inductance and capacity, connected to said anode for producing said clamping pulses from said synchronising pulses.

4. A circuit arrangement for eliminating low-frequency interference on a television video waveform, comprising an amplifier valve, a diode connected to the output of said amplifier valve, a condenser connected in series with said diode, across which a voltage is produced which is proportional to the low-frequency interference, an impedance connected across said condenser, a mixer circuit comprising two electronic valves each having an input electrode and having a common output load circuit, means for feeding the voltage across said condenser to the input electrode of the first of said valves means for feeding said video waveform carrying low-frequency interference to the input electrode of the second of said valves, a separating valve for separating the synchronising pulses from the picture intelligence of said video waveform, means for feeding the signals produced across the output load of said mixer circuit to the input of said separating valve, a delay network connected to the output of said separating valve, for producing line-to-line clamping pulses from said separated synchronising pulses a phase-splitting circuit connected to the output of said separating valve, for producing trains of positive and negative clamping pulses, a clamping circuit, means for feeding the positive and negative clamping pulses to said clamping circuit, means for feeding said video waveform carrying said low-frequency interference to said clamping circuit whereby said clamping pulses substantially clamp out said low-frequency interference and means for deriving a substantially interference-free video waveform from said clamping circuit.

5. A circuit arrangement as claimed in claim 4, wherein the phase-splitting device comprises an electronic valve having an anode, a cathode and at least one grid electrode, a first load resistor connected in series with said anode, a second load resistor connected in series with said cathode, and said clamping pulses are applied to said grid electrode, and wherein the clamping circuit comprises a first clamping diode, having an anode, and a cathode, means for feeding the positive clamping pulses developed across said second load resistor to the anode of said first clamping diode, a second clamping diode having an anode and a cathode, means for feeding the negative clamping pulses produced across said first resistor to the cathode of said second clamping diode, means for feeding the television video waveform carrying the low-frequency interference to the cathode of the first clamping diode, and to the anode of the second clamping diode to substantially clamp out the low-frequency interference on said video waveform.

6. A circuit arrangement for eliminating low-frequency interference on a television video waveform, comprising a video amplifier valve, having an input electrode to which said waveform is fed, such that the video signals are positive going and an output electrode, an electronic rectifier, having input and output electrodes, a D. C. connection between the input electrode of said rectifier and the output electrode of said video amplifier valve, a condenser connected between the output electrode of said electronic rectifier and a point of fixed potential, across which condenser a mean voltage is produced which is proportional to the low frequency interference on said video waveform, a resistor connected across said condenser, a pair of amplifier valves each having an input electrode and an output electrode, a common load circuit connected to the output electrode of each of said amplifier valves, a second condenser connected between the input of the first of said pair of amplifier valves and the output of the electronic rectifier, for feeding the low frequency interference produced across said second condenser to the input electrode of said first amplifier valve, a third condenser connected between the input electrode of said video amplifier valve and the input electrode of said second amplifier valve, for feeding the video waveform carrying low frequency interference to the input electrode of said second amplifier valve such that the interference voltage is in anti-phase with the low frequency voltage fed to said first amplifier valve, a separator valve, having an input electrode and an output electrode, for separating the video signals from the synchronising pulses in said video waveform, means for feeding the video waveform having substantially reduced low frequency interference thereon from said common load circuit to said separator valve, a delay network connected to the output electrode of said separator valve to form a series of line-to-line clamping pulses from the separated synchronising pulses, a phase-splitter valve, having an anode, a cathode and at least one grid electrode, means for feeding said line-to-line clamping pulses to the said electrode of said phase-splitter valve, a clamping circuit comprising a pair of clamping rectifiers, means for feeding clamping pulses from the anode of said phase splitter valve to the cathode of the first of said clamping rectifiers, means for feeding clamping pulses from the cathode of said phase splitter valve to the anode of the second of said clamping rectifiers, means for feeding the video waveform carrying said low frequency interference to the anode of said first clamping rectifier and to the cathode of said second clamping rectifier and means for deriving said substantial interference-free waveform from said clamping circuit.

References Cited in the file of this patent

UNITED STATES PATENTS

| Number | Name | Date |
|---|---|---|
| 2,227,057 | Blumlein | Dec. 31, 1940 |
| 2,289,948 | Wilson | July 14, 1942 |
| 2,299,945 | Wendt | Oct. 27, 1942 |
| 2,438,501 | Hings | Mar. 30, 1948 |
| 2,539,774 | Gluyas | Jan. 30, 1951 |
| 2,564,017 | Maggio | Aug. 14, 1951 |
| 2,589,927 | Crane et al. | Mar. 18, 1952 |

FOREIGN PATENTS

| Number | Country | Date |
|---|---|---|
| 562,702 | Great Britain | July 12, 1944 |